United States Patent [19]
Amorin et al.

[11] Patent Number: 5,979,980
[45] Date of Patent: Nov. 9, 1999

[54] MOTOR-VEHICLE SEAT

[75] Inventors: David Amorin; Yves Geoffroy; Eric Zunino, all of Nogent sur Vernisson, France

[73] Assignee: CESA- Compagnie Europeenne de Sieges pour Automobiles, Levallois-Perret, France

[21] Appl. No.: 09/014,168

[22] Filed: Jan. 27, 1998

[30] Foreign Application Priority Data

Feb. 13, 1997 [FR] France ................................. 97 01691

[51] Int. Cl.$^6$ ................................................. A47C 31/02
[52] U.S. Cl. .................................. 297/218.4; 297/218.3; 297/218.5; 297/452.59; 297/463.2
[58] Field of Search ........................... 297/216.14, 218.3, 297/218.4, 218.5, 228.11, 228.13, 452.59, 463.1, 463.2

[56] References Cited

U.S. PATENT DOCUMENTS

| | | | |
|---|---|---|---|
| 4,526,423 | 7/1985 | Meinershagen et al. | 297/463.1 |
| 4,723,814 | 2/1988 | Hunt | 297/228.13 |
| 5,507,554 | 4/1996 | Nakano et al. | |
| 5,582,463 | 12/1996 | Linder et al. | 297/218.5 |

FOREIGN PATENT DOCUMENTS

| | | | |
|---|---|---|---|
| 745506 | 5/1995 | European Pat. Off. | |
| 2539603 | 7/1984 | France | |
| 3410353 | 10/1985 | Germany | 297/218.3 |
| 4209391 | 10/1992 | Germany | |

*Primary Examiner*—Peter R. Brown
*Assistant Examiner*—Anthony D. Barfield
*Attorney, Agent, or Firm*—Sughrue, Mion, Zinn, Macpeak & Seas, PLLC

[57] ABSTRACT

This seat comprises a backrest armature (28) connected to a seat-part armature (22) by means (34) of articulation about an axis (X) substantially transverse to the seat. The backrest armature (28) carries a substantially transverse rod (56) for attaching a cover covering the backrest padding. This attachment rod, which runs close to the means (34) of articulation, has end extensions (60) forming protections intended to prevent a passenger sitting behind the seat from impacting against the means (34) of articulation. As a preference, each protective extension comprises a bow (60) curved around the axis (X) of articulation substantially parallel to a plane perpendicular to this axis.

9 Claims, 4 Drawing Sheets

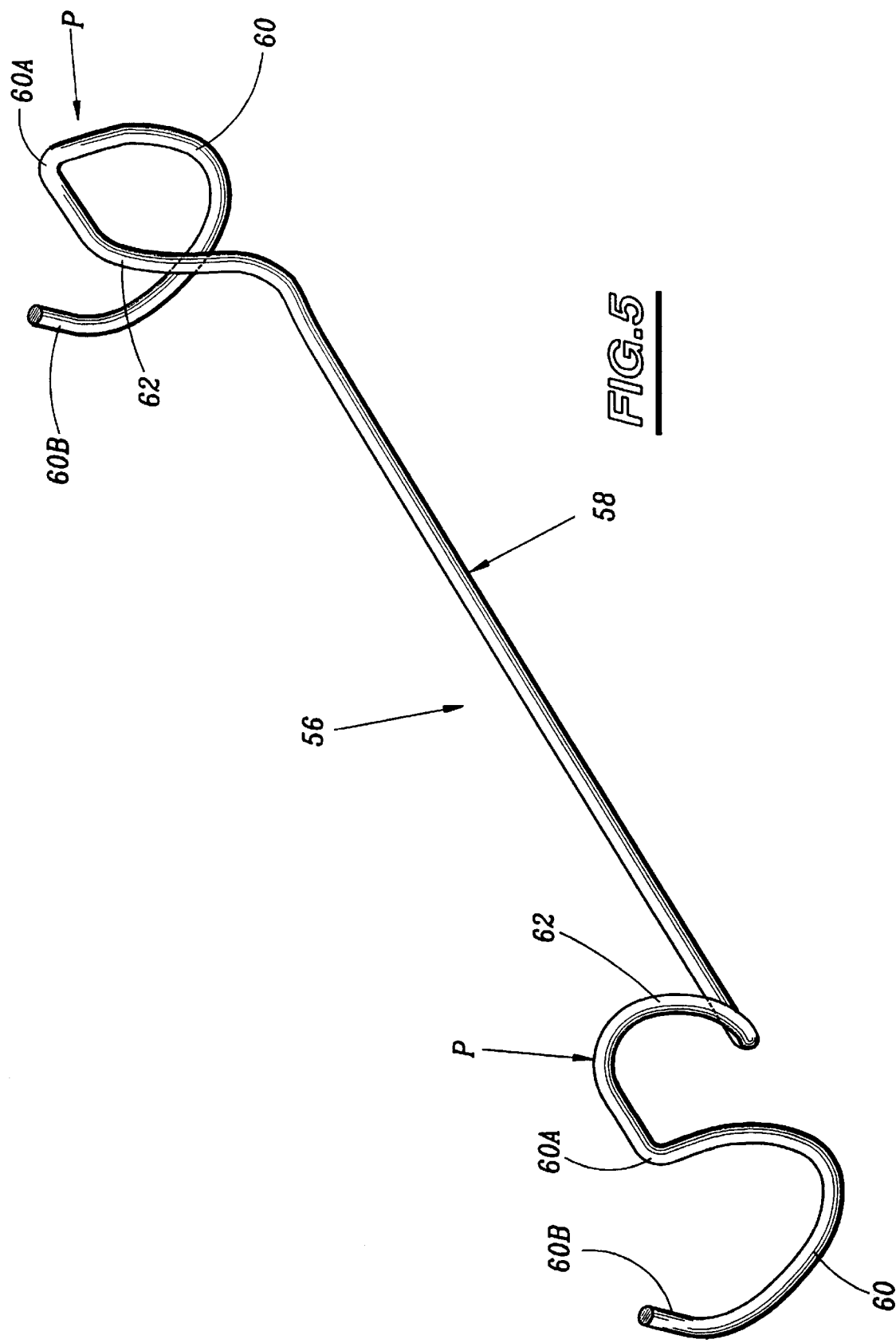

MOTOR-VEHICLE SEAT

The present invention relates to an improved motor-vehicle seat.

FR-A-2,722,150 (FR-A-94 08 297) discloses a motor vehicle seat, of the type comprising a seat part equipped with a seat-part armature and a backrest equipped with a backrest armature bearing padding covered by a cover, the backrest armature being connected to the seat-part armature by means of articulation about an axis substantially transverse to the seat, the backrest armature bearing a substantially transverse rod for attaching the back-rest cover, this rod running close to the means of arti-culation.

It is becomingly increasingly desirable to be able to place a seat of this type in various configurations of use, for example a normal configuration suited in particular for driving, in which the backrest is substantially vertical, or alternatively a "shelf" configuration, in which the backrest is folded down substantially horizontally against the seat part.

In the case of a front seat placed in a "shelf" configuration, the means of articulating the backrest of this seat form protrusions which point towards the rear seats in the cabin of the vehicle. In the event of a frontal impact, a passenger sitting behind the "shelf-configured" seat runs the risk of violently hitting certain dangerous elements of the means of articulation of this seat, particularly the projecting cheeks which articulate the seat part and backrest armatures of the seat.

The object of the invention is to prevent a passenger sitting behind a seat from impacting the dangerous elements of the means of articulating the backrest of this seat, when this backrest has been folded down against the seat part.

For this purpose, the subject of the invention is a motor vehicle seat of the aforementioned type, wherein the rod has end extensions which form protections intended to prevent a passenger sitting behind the seat from impacting against the means of articulation.

According to other features of this seat:
   each protective extension comprises a bow curved around the axis of articulation of the seat, substantially parallel to a plane perpendicular to this axis;
   the means of articulation comprise a pair of lateral articulations each one connecting a lateral cheek integral with the backrest armature to a corresponding lateral cheek integral with the seat-part armature, each backrest armature cheek being surrounded, at least partially, by a corresponding protective bow;
   the protective bow comprises a first end where it joins the rest of the rod and a second, free, end, this first end and this second end being fixed to the corresponding backrest cheek;
   the first end and second end of the bow are welded to the corresponding backrest cheek;
   the backrest armature comprises two tubular branches which have free ends delimiting backrest cheeks, these backrest cheeks each having a central region which is flattened by crushing the free ends and bordered by two substantially parallel hollow tubular rims, the free end of each bow being fitted into one of the tubular rims of the corresponding backrest cheek;
   the attachment rod comprises a portion forming a cross member connected to the two bows by two connecting portions which are bent into the overall shape of cranks, so that the portion forming a cross member is offset substantially at right angles to the axis of articulation with respect to the ends where the bows join, towards the bottom of the backrest when the latter is considered upright in a normal position of use;
   the backrest can be folded down against the seat part, in a substantially horizontal position, so that the seat can be placed in a shelf configuration.

The invention will be better understood from reading the description which will follow, given merely by way of example and made with reference to the drawings in which:

FIG. 5 is a perspective view of the link rod that attaches the backrest cover for the seat depicted in FIG. 1.

Figure 1:
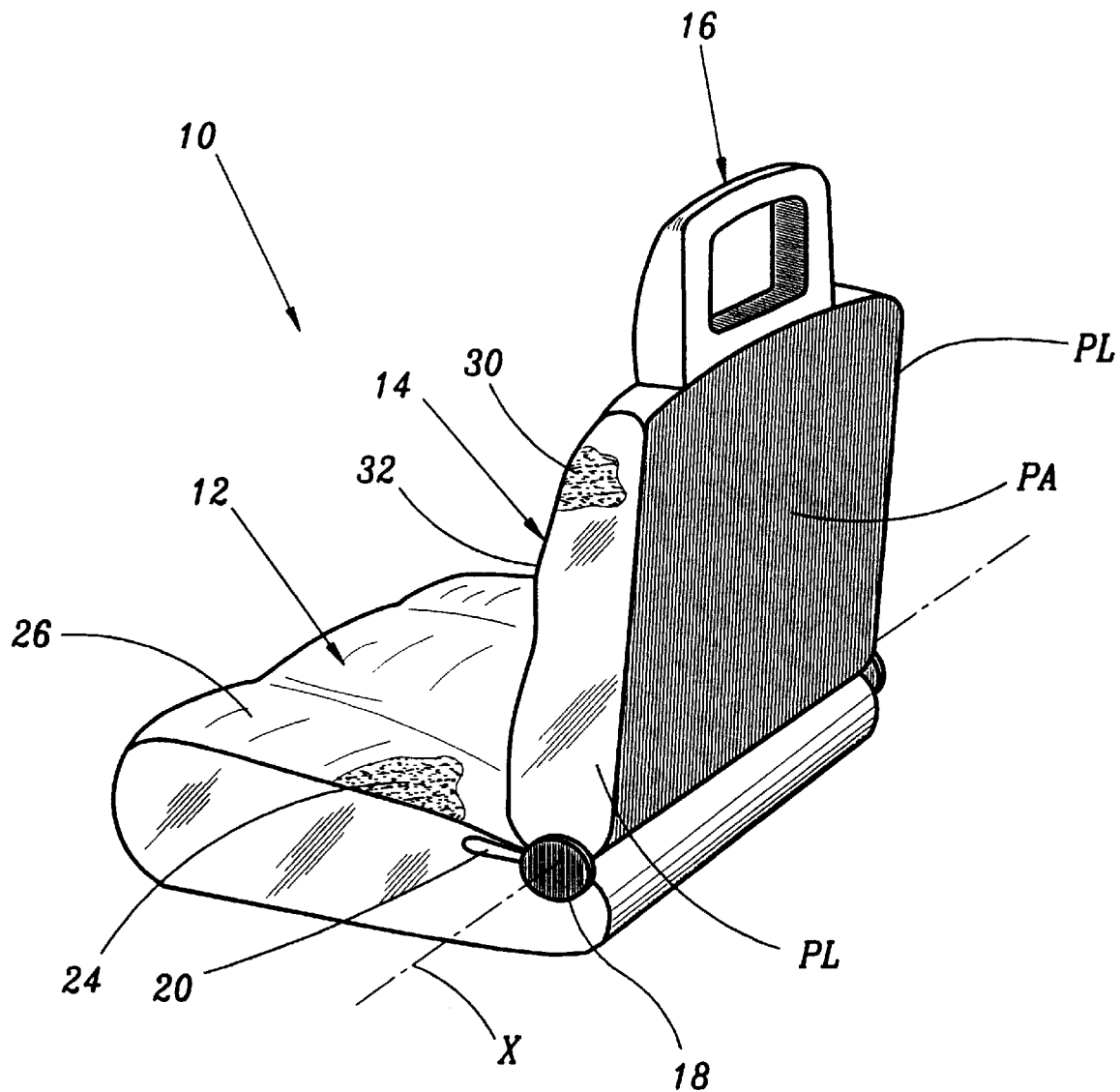
FIG. 1 is a perspective view of a motor-vehicle seat according to the invention.

FIG. 1 depicts a motor-vehicle seat 10 according to the invention, for example a front seat, comprising a seat part 12 and a backrest 14, surmounted by a head restraint 16.

The backrest 14 is articulated to the seat part 12 about an axis X substantially transverse to the seat 10, using means of articulation which will be described in further detail hereafter.

These means of articulation are operated in a way known per se, for example using a knob 18 and a lever 20.

The seat 10 can be placed in various configurations of use, particularly a configuration as a normal seat, suited particularly to driving, in which the backrest 14 is substantially vertical as depicted in FIG. 1, and a "shelf" configuration, in which the backrest 14 is folded down against the seat part 12 in a substantially horizontal position.

Figure 2:
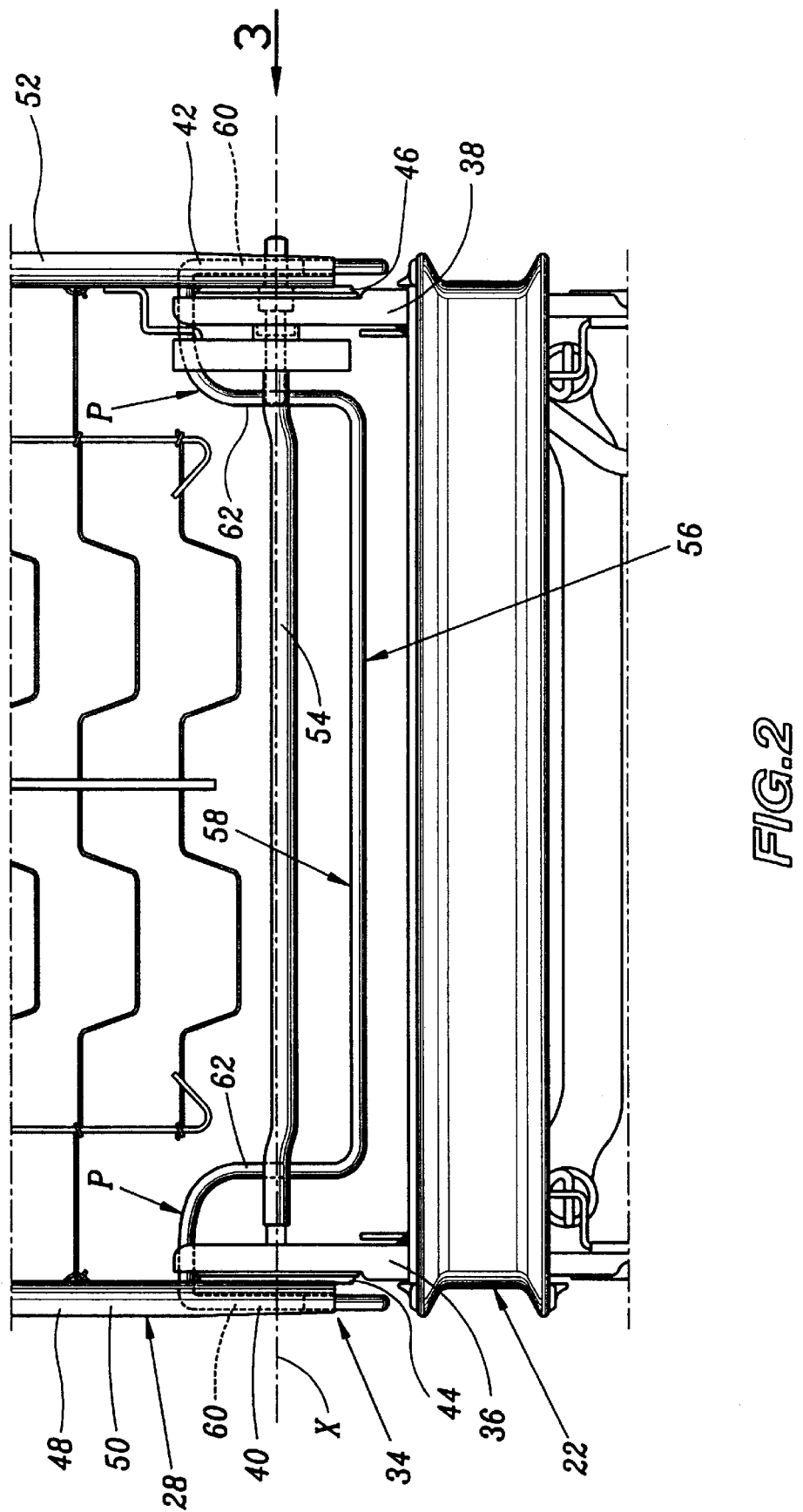
FIG. 2 is a front-on part view of the seat-part and backrest armatures of the seat depicted in FIG. 1.
Figure 3:
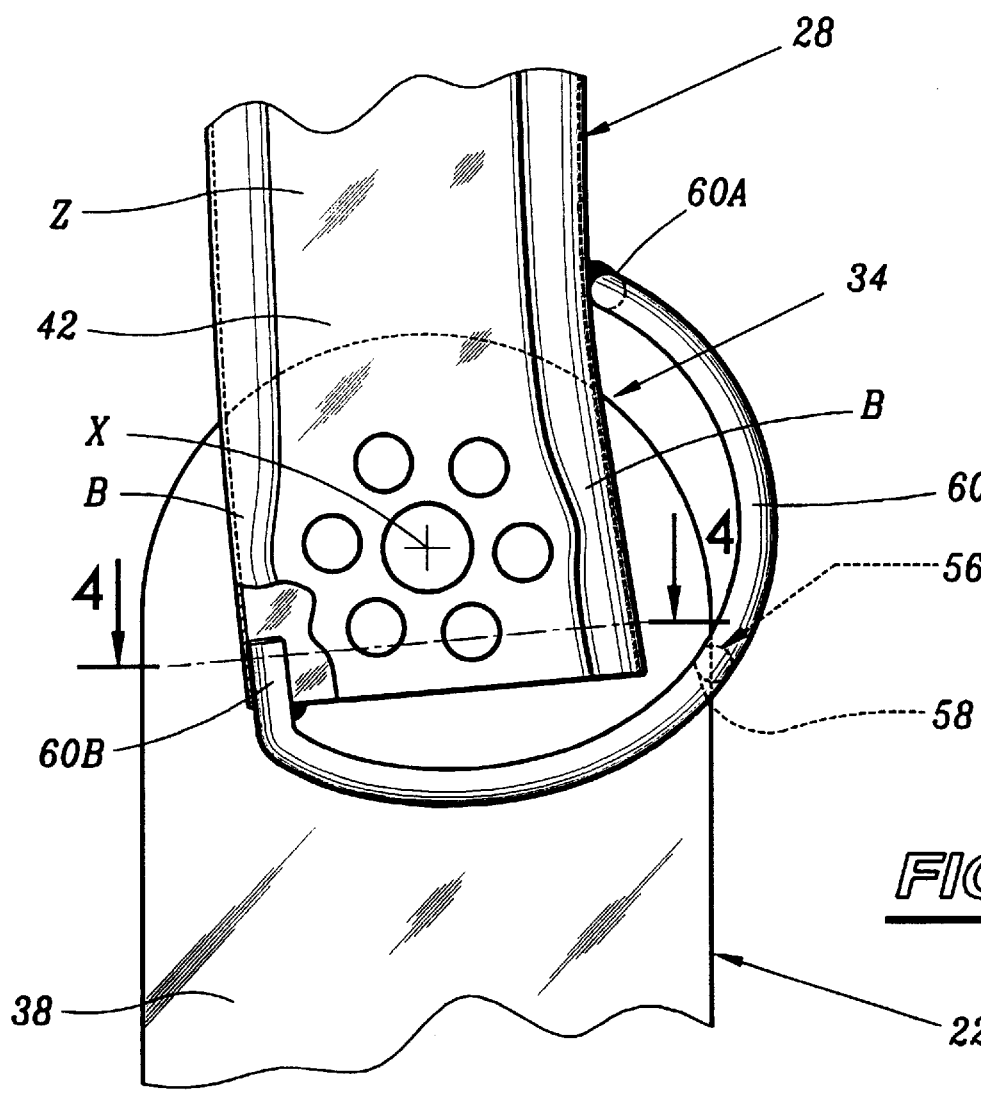
FIG. 3 is a view on an enlarged scale, in the direction of arrow 3 of FIG. 2, showing in particular two seat-part and backrest armature cheeks articulated together.

The seat part 12 comprises an armature 22, depicted in part in FIGS. 2 and 3, carrying padding 24 covered by a cover 26.

Similarly, the backrest 14 comprises an armature 28, depicted in part in FIGS. 2 and 3, bearing padding 30 covered by a cover 32.

This backrest cover 32 in particular comprises a rear panel PA and two sides or lateral panels PL.

The means 34 of articulating the backrest to the seat part connect the backrest armature 28 to the seat-part armature, as can be seen in particular in FIG. 2.

The means 34 of articulation comprise a pair of lateral cheeks 36, 38 integral with the seat-part armature 22, and a pair of lateral cheeks 40, 42 integral with the backrest armature 28. The means 34 of articulation additionally comprise a pair of lateral articulations 44, 46, each connecting a lateral seat-part cheek 36, 38 to a corresponding lateral backrest cheek 40, 42.

These articulations 44, 46 are conventional, for example of the type described and illustrated in FR-A-2,722,150 (FR-A-94 08297).

Figure 4:
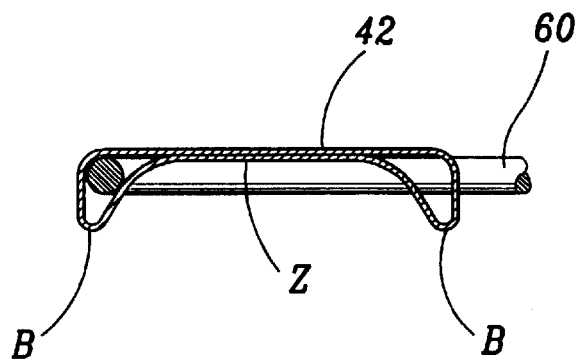
FIG. 4 is a view in section on 4—4 of FIG. 4.

It will be noted, if reference is made in particular to FIGS. 2 to 4, that the backrest armature 28 comprises a tube 48 bent into the overall shape of a U, with two tubular branches 50, 52 having free ends delimiting the cheeks 40, 42 for articulating the backrest.

These backrest cheeks 40, 42 each comprise a central region Z which is flattened by crushing the free ends of the tube 48, which region is longitudinally bordered by two hollow tubular rims B which are substantially mutually parallel.

The articulations 44, 46 are coupled together in a way known per se by a link rod 54.

FIG. 2 also depicts a rod 56 for attaching the backrest cover 32, the rod being borne by the backrest armature 28.

This rod 56 runs substantially transversely to the seat, close to the means 34 of articulation.

The rod 56, illustrated in detail in FIG. 5, has a portion 58 forming a cross member, to which the rear panel PA of cover the 32 is attached by conventional means. This portion 58 has end extensions P forming protections intended to prevent a passenger sitting behind the seat 10 from impacting the dangerous elements of the means 34 of articulation, especially the lateral cheeks 36 to 42.

Each extension P has a bow 60 curved around the axis X, substantially parallel to a plane perpendicular to this axis, as can be seen in particular from FIG. 3.

The two bows 60 are connected to the portion 58 forming the cross member 58 by two connecting portions 62 which are bent into the overall shape of a crank.

Each bow 60 has a first end 60A at which it joins the rest of the rod, more precisely the corresponding connecting portion 62, and a second, free, end 60B. Referring to FIG. 3, it can be seen that the joining end 60A and the free end 60B of each bow are fixed, preferably by welding, to a corresponding backrest cheek 40, 42, so that they surround this cheek, at least in part.

As a preference, the free end 60B of the bows 60 is fitted into one of the hollow tubular rims B of the corresponding backrest cheek 40, 42.

It will be noted that the connecting portions 62, in the overall shape of cranks, allow the portion 58 forming the cross member to be offset substantially perpendicular to the axis X with respect to the first ends 60A of the bows, towards the bottom of the backrest 14 when the latter is considered in its upright substantially vertical position. Thus, the portion 58 forming the cross member is low enough down in the backrest for the rear panel PA of the cover satisfactorily to cover the bottom of the backrest.

It will be noted that the sides PL of the backrest cover 32 may advantageously be attached to the bows 60 in order to obtain a very satisfactory external appearance of the cover 32.

The invention has many advantages.

When the seat according to the invention is in a "shelf" configuration (the backrest 14 being folded down against the seat part 12), the bows 60 of the attaching rod 56 prevent a passenger sitting behind the seat from impacting, on the one hand, the backrest cheeks 40, 42 which are surrounded at least in part by the bows 60 attached thereto, and, on the other hand, the seat-part cheeks 36, 38 and the articulations 44, 46 which run close to the bows 60, set back from the latter if the direction in which the passenger is thrown in a frontal impact is considered.

The articulation cheeks 36 to 42 actually have pointed or cutting edges or corners likely, in the absence of the protective bows, of injuring a passenger who knocks against them.

The rod for attaching the cover, equipped with the extensions that form protections, is very simple to manufacture, particularly by bending a metal wire. Thus, the attachment rod makes it possible to avoid the costly fitting of protective casings around the means of articulating the backrest.

Furthermore, the portion forming a cross member and the bows of the attachment rod allow the rear and lateral panels of the backrest cover to be attached in a simple way, at the same time obtaining an excellent finish.

Of course, the invention is applicable to any vehicle seat in which it is desirable for the means of articulating the backrest to be protected, even if the backrest is not intended to be folded down fully against the seat part but can simply be inclined towards the seat part.

We claim:

1. Motor vehicle seat, of the type comprising a seat part (12) equipped with a seat-part armature (22) and a backrest (14) equipped with a backrest armature (28) bearing padding (30) covered by a cover (32), the backrest armature (28) being connected to the seat-part armature (22) by means (34) of articulation about an axis (X) substantially transverse to the seat, the backrest armature (28) bearing a substantially transverse rod (56) for attaching the backrest cover (32), this rod (56) running close to the means (34) of articulation and having end extensions (P) which form protections intended to prevent a passenger sitting behind the seat from impacting against the means (34) of articulation.

2. Seat according to claim 1, wherein each protective extension (P) comprises a bow (60) curved around the axis (X) of articulation of the seat, substantially parallel to a plane perpendicular to this axis (X).

3. Seat according to claim 2, wherein the means (34) of articulation comprise a pair of lateral articulations (44, 46) each one connecting a lateral cheek (40, 42) integral with the backrest armature (28) to a corresponding lateral cheek (36, 38) integral with the seat-part armature (22), each backrest armature cheek (40, 42) being surrounded, at least partially, by a corresponding protective bow (60).

4. Seat according to claim 3, wherein the protective bow (60) comprises a first end (60A) where it joins the rest of the rod (56) and a second, free, end (60B), this first end (60A) and this second end (60B) being fixed to the corresponding backrest cheek (40, 42).

5. Seat according to claim 4, wherein the first end (60A) and second end (60B) of the bow are welded to the corresponding backrest cheek (40, 42).

6. Seat according to claim 5, wherein the backrest armature (28) comprises two tubular branches (50, 52) which have free ends delimiting backrest cheeks (40, 42), these backrest cheeks each having a central region (Z) which is flattened by crushing the free ends and bordered by two substantially parallel hollow tubular rims (B), the free end (60B) of each bow (60) being fitted into one of the tubular rims (B) of the corresponding backrest cheek (40, 42).

7. Seat according to claim 4, wherein the backrest armature (28) comprises two tubular branches (50, 52) which have free ends delimiting backrest cheeks (40, 42), these backrest cheeks each having a central region (Z) which is flattened by crushing the free ends and bordered by two substantially parallel hollow tubular rims (B), the free end (60B) of each bow (60) being fitted into one of the tubular rims (B) of the corresponding backrest cheek (40, 42).

8. Seat according to claim 4, wherein the attachment rod (56) comprises a portion forming a cross member (58) connected to the two bows (60) by two connecting portions (62) which are bent into the overall shape of cranks, so that the portion (58) forming a cross member is offset substantially at right angles to the axis of articulation (X) with respect to the ends (60A) where the bows join, towards the bottom of the backrest (14) when the latter is considered upright in a normal position of use.

9. Seat according to claim 1, wherein the backrest (14) can be folded down against the seat part (12), in a substantially horizontal position, so that the seat can be placed in a shelf configuration.

\* \* \* \* \*